H. DIEHL.
RAILWAY SIGNAL.
APPLICATION FILED APR. 23, 1907.
901,958.
Patented Oct. 27, 1908.
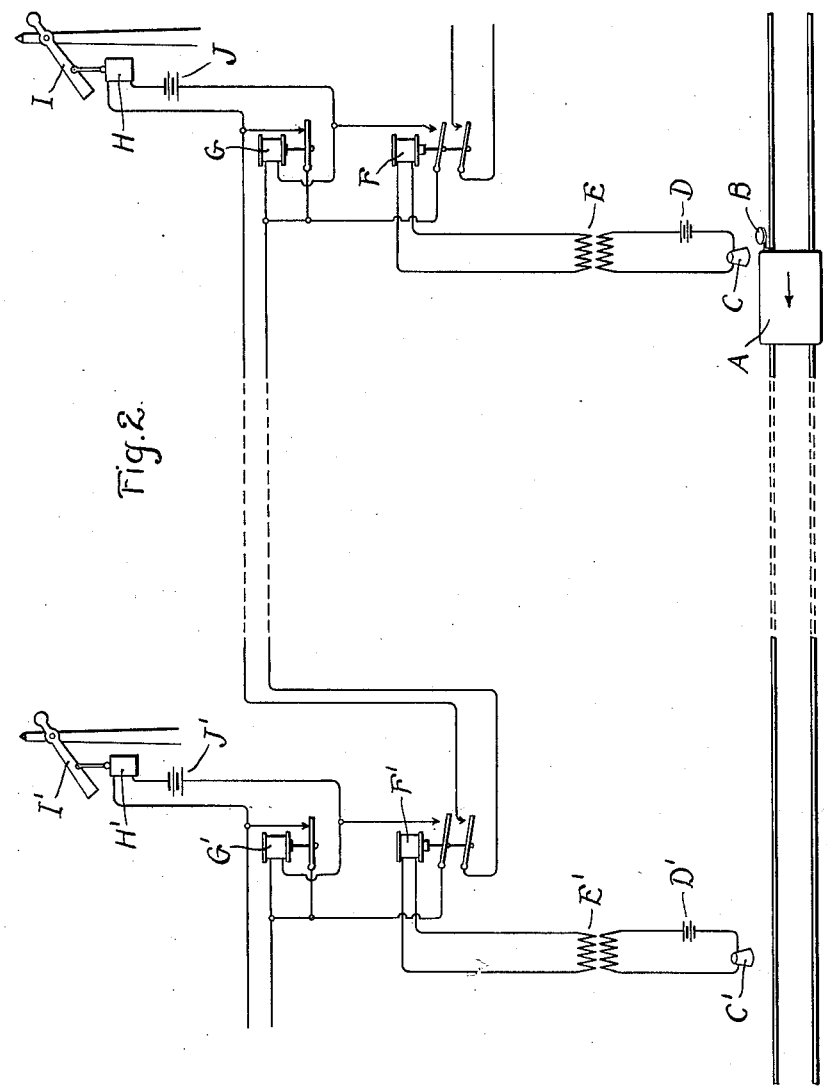
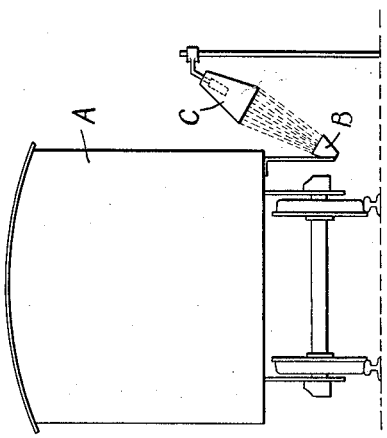
Witnesses
Lester H. Fulmer.
J. Ellis Glen
Inventor.
Heinrich Diehl.
by Albert G. Davis
Atty.

UNITED STATES PATENT OFFICE.

HEINRICH DIEHL, OF BERLIN, GERMANY, ASSIGNOR TO GENERAL ELECTRIC COMPANY, A CORPORATION OF NEW YORK.

RAILWAY-SIGNAL.

No. 901,958.

Specification of Letters Patent.

Patented Oct. 27, 1908.

Application filed April 23, 1907. Serial No. 369,856.

*To all whom it may concern:*

Be it known that I, HEINRICH DIEHL, a subject of the Emperor of Germany, residing at Berlin, Germany, have invented certain new and useful Improvements in Railway-Signals, of which the following is a specification.

My invention relates to railway signal systems in which the control of the signals is secured by the coöperation of selenium cells placed along the trackway and sources of light on the cars. The resistance of a selenium cell varies with the amount of light to which the cell is exposed, as is well known in the art, and this characteristic may be utilized to control a signal by placing a selenium cell close to the track and providing means on a car for throwing light on the cell in passing it. A signal system thus arranged is subject, to a certain extent, to disturbances produced by variations in the light falling on the cell from other sources than that on a passing car. For instance, the variation in sunlight through the day may exercise a disturbing influence on the cell and the devices in circuit with it.

My present invention has for its object to eliminate such disturbances. For this purpose I take advantage of the fact that while the variations in the light thrown on the cell by a passing car are sudden, the variations due to other causes, such as sunlight, are gradual.

My invention consists in so arranging the signal-controlling devices that they respond only to a sudden variation of current in the cell circuit. This result may be secured by controlling the signal by a current produced inductively by the current in the circuit of the selenium cell, as by using a relay of the induction type, or by inserting a transformer between the cell and the relay.

My invention will best be understood by reference to the accompanying drawings, in which Figure 1 shows diagrammatically a car provided with a source of light and a selenium cell arranged to be affected thereby; and Fig. 2 is a diagram of the circuit connections of a signal system arranged in accordance with my invention.

In the drawings A represents a car carrying a source of light B. This source may be of any suitable character.

C represents a selenium cell placed adjacent to the track and provided with a hood arranged to receive the rays of light from the source B. A battery D and the primary of a transformer E are connected in series with the cell C. To the secondary of the transformer is connected a relay F. With this arrangement the relay is not affected by any gradual change of current in the circuit of the cell, such as would be produced by a variation in sunlight, but responds only to a sudden variation of current in the cell circuit, such as would be produced by the light thrown on the cell by a passing train. The relay F controls a relay G, the armature of which is in circuit with the operating mechanism H of a signal I.

J represents a battery or other suitable source for the operating mechanism.

The signals are shown as operating on a normal clear principle, but it will be understood that they might equally well be operated on the normal danger plan.

In the operation of the system as arranged in Fig. 2, the car A, moving in the direction of the arrow, throws light from the source B onto the cell C in passing it, thereby producing a sudden fluctuation in the resistance of the cell. This produces a sudden variation of current-flow in the circuit of the cell, which induces a current in the secondary of transformer E. Relay F is momentarily energized by this current, and raises its armatures. The upper armature of the relay short-circuits the relay winding G, causing it to drop its armature, thereby breaking the circuit of the operating mechanism H, and allowing signal I to go to danger. Although relay F is energized only momentarily, and drops its armature again as soon as the car has passed the cell C, relay G does not pick up its armature, since its own circuit, as well as the circuit of the operating mechanism, has been broken. Signal I consequently remains at danger until the car reaches the cell C'. When relay F' is energized, thereby setting signal I' at danger, as has been above explained, its lower armature closes a shunt circuit around the contacts of relay G, thereby momentarily energizing the relay and causing it to draw up its armature. The armature of relay G, when raised, not only closes the circuit of the operating mechanism of signal I, but also maintains the relay winding G energized.

The specific connections of the signal-controlling devices described above form no part of my present invention, and I do not desire to limit myself to the particular construction and arrangement of parts here shown, but aim in the appended claims to cover all modifications which are within the scope of my invention.

What I claim as new and desire to secure by Letters Patent of the United States, is,—

1. In a railway signal system, a device adjacent to the trackway that varies in resistance with variation in light, means carried by a moving car for varying the light on said device, a source of current in circuit with said device, and signal controlling means responsive only to a sudden variation in the current from said source.

2. In a railway signal system, a selenium cell adjacent to the trackway, means carried by a moving car for throwing light on said cell, a source of current in circuit with said cell, and signal controlling means responsive only to a sudden variation in the current from said source.

3. In a railway signal system, a device adjacent to the trackway that varies in resistance with variation in light, means carried by a moving car for varying the light on said device, a source of current in circuit with said device, an inductive winding in circuit with said cell and said source, and signal-controlling means actuated by current produced inductively by said winding.

4. In a railway signal system, a selenium cell adjacent to the trackway, means carried by a moving car for throwing light on said cell, a source of current in circuit with said cell, an inductive winding in circuit with said cell and said source, and signal controlling means actuated by current produced inductively by said winding.

5. In a railway signal system, a device adjacent to the trackway that varies in resistance with variation in light, means carried by a moving car for varying the light on said device, a source of current in circuit with said device, a transformer having its primary in circuit with said cell and said source, and signal-controlling means connected to the secondary of said transformer.

6. In a railway signal system, a selenium cell adjacent to the trackway, means carried by a moving car for throwing light on said cell, a source of current in circuit with said cell, a transformer having its primary in circuit with said cell and said source, and signal-controlling means connected to the secondary of said transformer.

In witness whereof, I have hereunto set my hand this tenth day of April, 1907.

HEINRICH DIEHL.

Witnesses:
JULIUS RUMLAND,
OSKAR SINGER.